UNITED STATES PATENT OFFICE.

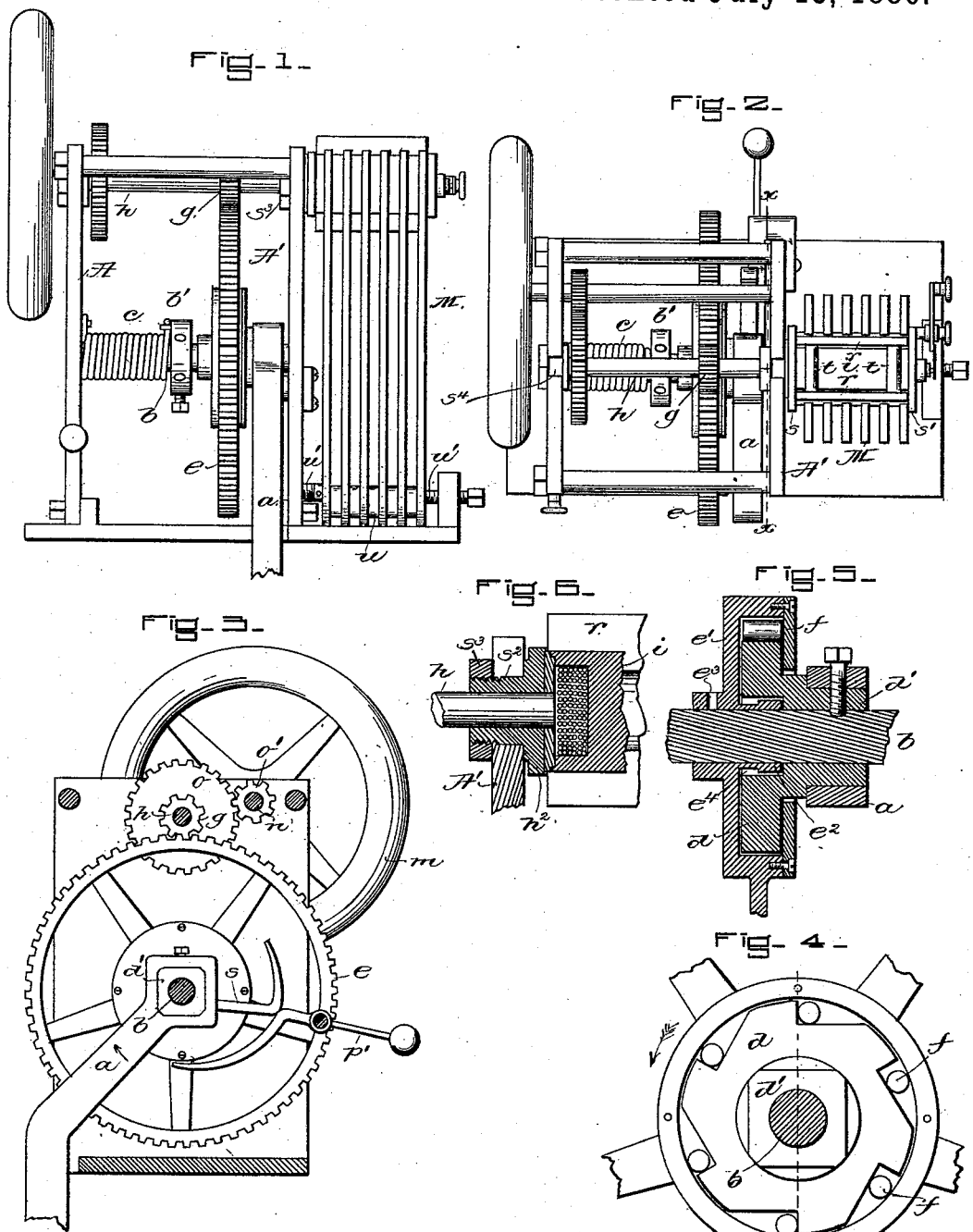

MALCOLM W. LONG, OF HYDE PARK, MASSACHUSETTS.

RAILWAY-SIGNAL.

SPECIFICATION forming part of Letters Patent No. 345,641, dated July 13, 1886.

Application filed August 13, 1883. Serial No. 103,600. (No model.)

*To all whom it may concern:*

Be it known that I, MALCOLM W. LONG, of Hyde Park, county of Norfolk, State of Massachusetts, have invented an Improvement in Magneto-Electric Generators for Railway-Signals, of which the following description, in connection with the accompanying drawings, is a specification, like letters on the drawings representing like parts.
My invention relates to a magneto-electric generator adapted to be actuated by trains passing on a railway-track, so as to produce electric currents by which signals or other appliances may be actuated at a distance from the said trains—as, for instance, at a highway-crossing—in advance of the train, to serve as a warning that the train is approaching.

For the proper operation of a railway-signal by the currents produced by a magneto-generator actuated by trains passing on a railway-track, it is desirable that the generator shall continue in action after the train has passed as long a time as possible, and that the parts of the generator shall be constructed and arranged so that the generator will perform under the conditions peculiar to a situation on a railroad-track, where it cannot have very frequent inspection or constant care; and the object of my present invention is to produce a generator in which the mechanical impulses produced by a passing train will effect the rotation of the armature at such a moderate speed that the electrical impulses will from the first start be effective to actuate the moving parts of a signal, and, also, by giving momentum to a fly-wheel, effect such a storage of power in said fly-wheel that, after the mechanical impulses imparted by the passing train have ceased the momentum of the fly-wheel will be gradually expended and utilized in giving prolonged rotation to the armature; also to prevent lubricating material from working into places where it may prevent proper action of the generator.

The generator consists, essentially, of an armature provided with a coil of wire and mounted on a shaft in proper proximity to the poles of a permanent magnet, and suitable gearing by which a continuous rotary movement is imparted to the said shaft and armature from the intermittent impulses derived from the wheels of the passing train, the said impulses in this instance producing an oscillating movement in an arm, which, by a suitable ratchet or clutch, imparts a rotary movement in one direction.

Figure 1 is a side elevation of a generator embodying this invention; Fig. 2, a plan view thereof; Fig. 3, a vertical section on line *x x*, Fig. 2; Fig. 4, a detail, on a larger scale, of the ratchet or clutch for converting the oscillating into rotary motion; Fig. 5, a vertical section thereof, and Fig. 6 a sectional detail of a portion of the armature and its shaft and bearing.

In another application, No. 91,877, filed April 16, 1883, I have shown a generator similar to the one forming the subject of the present application, in connection with a signal and a switch for automatically controlling the circuit, so as to cause the signal to cease operating when the train arrives at the crossing, although the generator may continue to operate by its momentum for some time afterward.

The arm $a$ of the generator may be operated with a vibrating or oscillating movement derived from the wheels of the passing train, by means of a rock-shaft having a treadle to be struck by the wheels and a tappet to engage the said arm $a$, as shown in the said former application.

As the impulses imparted by the wheels of a passing train are very sudden—practically the same as a series of blows—it has been found impracticable to make a durable and effective mechanism when the generator is operated directly by those impulses, and I therefore arrange on a rock-shaft, $b$, to which the arm $a$ is rigidly attached, a helical spring, $c$, one end of which is attached to the frame-plate A, and the other end bears against a projecting stud on a collar, $b'$, on shaft $b$, so that the spring will be strained whenever the arm $a$ is struck by the tappet and moved in the direction of the arrow marked on the arm $a$, Fig. 3, by the wheel of a passing train striking the operating-treadle, and when the wheel passes off the treadle the reaction of the spring $c$ will tend to turn the collar $b'$, rock-shaft $b$, and the arm $a$ in the direction opposite to the arrow aforesaid. The said shaft $b$ also has fixed upon it a ratchet-hub, $d$, having a series of inclined recesses in its periphery, as shown in Fig. 4, and having a squared portion, $d'$, to receive the arm $a$. The said shaft $b$ has loose upon it a gear, $e$, the hub $e'$ of which is chambered to embrace the said ratchet-hub $d$, that is fixed upon the shaft. A series of cylinders or rollers, $f$, is placed in the recesses of the ratchet-hub $d$, they being slightly smaller than the space between the said ratchet-hub and the inner surface of the chamber in the hub $e'$ of the gear $e$ when in the deepest portion of the said recesses, thus permitting the gear $e$ to rotate freely upon the shaft $b$ and about the ratchet-hub $d$ in the direction of the arrow, Fig. 4, when the said shaft and ratchet-hub are stationary or turning in the opposite direction. When, however, the shaft and ratchet-hub are also rotated in the direction of the arrow, Fig. 4, by the stress of the spring $c$, the said cylinders $f$ will be wedged between the ratchet-hub $d$ and the inner surface of the chamber in the hub $e'$ of the gear $e$, causing the gear $e$ to move with the shaft $b$ or to be actuated by the power of the spring $c$. When it is desirable to have the revolutions of the armature continue a very long time, the collar $b'$ is turned back against the spring, drawing that end of the spring farther around the shaft, thus increasing the intensity or force with which the spring will recoil after the rock-shaft $b$ has been rotated against the spring by the operation of the treadle, &c. By this means it is practicable to regulate to a large extent the duration of movement of the armature to suit the various requirements occasioned by the various distances at which the signal must be operated. Thus at each downward movement of the arm $a$ the gear $e$ is acted upon by its weight and by the force of the spring $c$, so that by a series of upward and downward movements of the said arm the said gear will finally be set in rapid rotation.

The hub $e'$ may be extended on the shaft $b$, making a journal-bearing of length sufficient to insure the gear $e$ to run steadily on the shaft $b$, having the side or wall of the chamber in the gear $e$ adjacent to the side of the ratchet-hub $d$ a plain surface; but I have found that when thus constructed the oil necessary to lubricate the journal-bearing and make the gear $e$ revolve freely on the shaft $b$ will continually work out of the journal-bearing onto the wall of the chamber and by centrifugal action find its way out to the periphery of the ratchet-hub $d$, where it will interfere with the proper action of the rollers $f$, and after the oil has become congealed by evaporation or cold will entirely prevent the rollers $f$ from moving out, thus preventing the gear $e$ from being actuated by the movements of the ratchet-hub $d$. To overcome this difficulty, I make a tubular extension, $e^2$, on the hub $e'$, and make said extension project into a recess of suitable size in the ratchet-hub $d$, as shown in Fig. 5, the end of said extension $e^2$ being made larger than the remainder of it, forming, in effect, an annular space around said extension, as shown at $e^4$, Fig. 5. When oil exudes from the end of the hub $e'$, it will by centrifugal action cling to the part $e^2$, and cannot pass the annular space which it must needs pass before it finds its way to the periphery of the ratchet-hub $d$. By this improvement the oil is effectually excluded from the periphery of the ratchet-hub $d$ or the inner face of the chamber, and cannot in the manner first above described prevent proper action of the ratchet-hub $d$ and the gear $e$, and the continued and successful operation of the generator for long periods without cleaning or inspection is made reasonably certain.

The gear $e$ meshes with the pinion $g$ on a shaft, $h$, upon which is fixed the armature $i$, which is shown as of the form commonly known as a "Siemens armature," which is placed between the pole-pieces of the compound permanently-magnetized steel magnet M.

As shown in the former application, the generator is intended to be used with a signal-bell the hammer of which is vibrated by the alternating current generated by the revolutions of the armature $i$, and it is essential that the alternations of the currents, as effected by the revolutions of the armature, should be as much as possble regulated, and made at intervals of such length that the striker of the signal has sufficient time to respond, because any form of electro-magnet used in the striking action requires a certain amount of time to become demagnetized after a current of one polarity has ceased its effect before it can become fully magnetized by a current of opposite polarity; and it is also essential that after the passage of a train the revolutions of the armature should continue as long a time as possible.

As is well known, whenever an armature is revolved in a magnetic field the resistance offered by the magnetic force tends to hold the armature and to resist its revolution. When a fly-wheel is mounted directly on the shaft of an armature, this resistance affects directly the revolutions of the fly-wheel, and produces on it the effects of a brake to retard its revolutions, this effect being greater at the moderate speed requisite for the proper operation of the striker; and I therefore arrange on a shaft, $n$, a fly-wheel, $m$, which by means of gears $o$ and $o'$ is made to revolve at a speed three times faster than the speed of the armature, so that while the actuating force rotates the armature at a speed not too rapid for the proper operation of the signal, it also rotates the fly-wheel at a much swifter speed, securing several important advantages, viz:

First. When a movement of the gearing begins (as the result of the first impulses produced by the train) the recoil of the spring $c$ is opposed by a gradually-decreasing resistance, which decreases as the speed of the fly-wheel is accelerated, and the armature starts slowly and steadily, by which is prevented the strains and wear which the gearing would be likely to receive if the recoil of the spring could cause the gearing to spin around, also preventing the injury to the armature which is liable to occur from its being suddenly set into rapid rotation.

Second. While the rock-shaft $b$ is being operated by the wheels of the train, giving motion to the gear $e$, (through the treadle, arm $a$, spring $c$, and ratchet-hub $d$,) the armature obtains its movement wholly from the gear $e$, the fly-wheel simply receiving its movement and impetus from the armature-shaft. Thus during the time that the generator is being operated by the wheels of a train, the fly-wheel performs the office of a regulator for the armature and prevents the motion of it from being jerky, and at the same time the fly-wheel acquires considerable momentum, and thus stores up a large amount of power, which, after the train has passed and ceased to produce movement of the gearing, is all utilized and expended in the proper operation of the signal, because as soon as the gear $e$ ceases to propel the armature, (by the force applied through its connections to the rock-shaft,) the fly-wheel becomes the motive power through the gears $o$ and $o'$, to continue the revolutions of the armature, the gear $e$ during this period running simply as an idler and doing no service whatever toward prolonging the operation of the signal.

Third. During the time that the wheels of the train are producing the movements of the generator, the resistance which the magnetic forces offer to the revolution of the armature is an element of minor importance, as there is abundant power to overcome it, but when the train has passed and movement of the armature has to be kept up by the "stored-up" power, the aforesaid resistance becomes a very important element from its retarding effect. Therefore, the fact that during this time the fly-wheel makes three revolutions to one revolution of the armature, and has therefore a three-fold power or leverage over the armature, secures the important advantage of minimizing the aforesaid resistance and effecting the best possible economy of the stored-up power in meeting it.

When permanent magnets are placed close together to form compound magnets, there is loss of magnetic power through action of magnetic forces against each other, and I have found it important to keep the several magnets from touching each other; also that when the several magnets were separated by soft-iron pieces, the compound magnet was stronger and more permanent than when non-magnetic distance-pieces were used as separators, and I have therefore, in constructing the compound permanent magnet M, provided soft-iron pole-pieces $r\ r$, which, on the inside, are fitted for the armature to revolve in close proximity to the surface in the usual manner, and on the outside are provided with notches adapted to receive the ends of the steel horseshoe-magnets, forming the compound magnets, so that the portion of soft-iron between the notches may serve as separators between the several magnets, and also serve to hold their ends in place. The open ends of the several magnets are slightly sprung apart to allow the ends of the magnets to slip into the notches. Thus by the spring action of the steel horseshoe-magnets themselves they are held to the pole-pieces, securing the best possible magnetic contact of the pole-pieces and the several horseshoe-magnets. Non-magnetic distance-pieces $t\ t$ are fitted between the pole-pieces $r\ r$ above and below the armature. Non-magnetic plates $s$ and $s'$ are fixed on the ends of the pole-pieces $r\ r$. The plate $s$ has a tubular neck, $s^2$, passing through the frame-plate A', and is provided with a nut, $s^3$, by which the plate $s$ (and with it the pole-pieces $r\ r$) are securely held to the frame-work. The plate $s'$ forms a bearing for the other end of the armature.

I claim—

1. In a magneto-electric generator for railway signals, the combination of arm $a$, spring $c$, shaft $b$, ratchet-hub $d$, rollers $f$, and gear $e$, substantially as and for the purpose specified.

2. In an electric generator for railway-signals, &c., the combination, with an armature and gear for driving the same, of arm $a$, its shaft $b$, the helical spring $c$, and the ratchet hub or clutch $d$.

3. In an electric generator for railway-signals, &c., the combination of the arm $a$, its shaft $b$, the clutch connecting said shaft with the armature-driving gear, the helical spring $c$, and the collar $b'$, adjustable, as described, to vary the tension of the spring, whereby the tension of the spring may be adjusted as the speed of the trains, the character of the signal, or other controlling circumstance may demand.

4. In a magneto-electric generator for railway-signals, the combination of armature $i$, gearing and ratchet devices, whereby the armature is revolved by the combined action of the ratchet-hub $d$, rollers $f$, and chambered gear $e$, the latter being provided with hub-extension $e^2$, substantially as and for the purpose specified.

5. In a magneto-electric generator for railway-signals, the combination of armature $i$, shaft $h$, gears $e$, $o$, and $o'$, and the fly-wheel $m$, mounted on separate shaft $n$, whereby at first the armature has its revolutions regulated by the fly-wheel, and later the armature derives its motive power directly from the fly-wheel, substantially as and for the purpose specified.

6. In a magneto-electric generator for railway-signals, the combination of shaft $b$, collar $b'$, helical spring $c$, ratchet-hub $d$, rollers $f$, gears $e$, $g$, $o$, and $o'$, and fly-wheel $m$, with the shaft $h$, and armature $i$, whereby a steady motion is imparted to the armature by the vibratory movements imparted to the shaft $b$ by impulses received on arm $a$, substantially as and for the purpose specified.

7. The combination of the frame-plate A, armature $i$, plate $s$, with tubular neck $s^2$, fitted for bearing for armature-shaft, and the nut $s^3$, the whole being arranged substantially as and for the purpose described.

8. The combination of armature $i$ and pole-pieces $r\ r$, provided with notches on the outside, with the steel horseshoe magnets composing magnet M, the said horseshoe-magnets being held in place by spring action, substantially as and for the purpose specified.

9. In a magneto-generator for operating railway-signals, the combination of an armature, a gear-train to drive the same, track-connections, substantially as described, for imparting motion to said train, and a fly-wheel geared to the train to revolve at a speed greater than that of the armature, whereby said wheel is caused, first, to retard and limit the speed of the armature, and, second, to prolong the motion of the armature, as described.

In testimony whereof I have signed my name to this specification in the presence of two subscribing witnesses.

MALCOLM W. LONG.

Witnesses:
JOS. P. LIVERMORE,
B. J. NOYES.